Dec. 20, 1938.  S. R. HIRSCH  2,140,744

BEER COOLING AND DISPENSING APPARATUS

Filed Feb. 4, 1937  4 Sheets-Sheet 1

S. R. HIRSCH.
INVENTOR

BY
ATTORNEY

Dec. 20, 1938.　　　　S. R. HIRSCH　　　　2,140,744
BEER COOLING AND DISPENSING APPARATUS
Filed Feb. 4, 1937　　　4 Sheets—Sheet 2

S. R. HIRSCH.
INVENTOR
BY
ATTORNEY

Dec. 20, 1938. S. R. HIRSCH 2,140,744
BEER COOLING AND DISPENSING APPARATUS
Filed Feb. 4, 1937 4 Sheets-Sheet 3
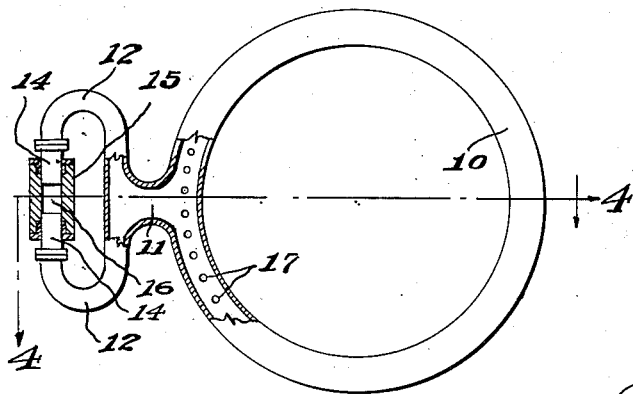
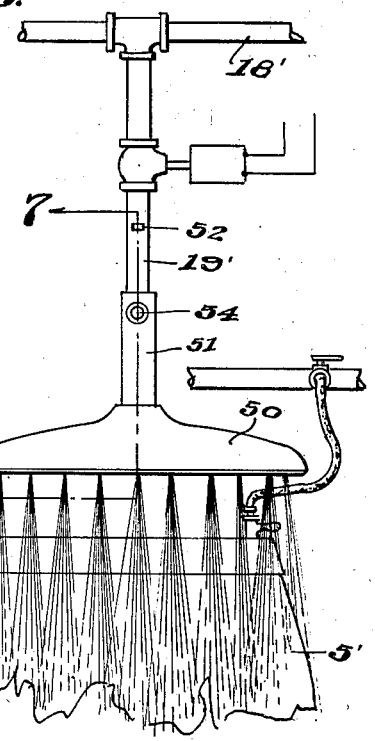
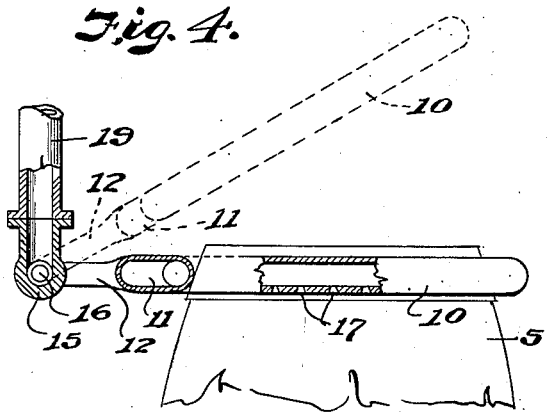
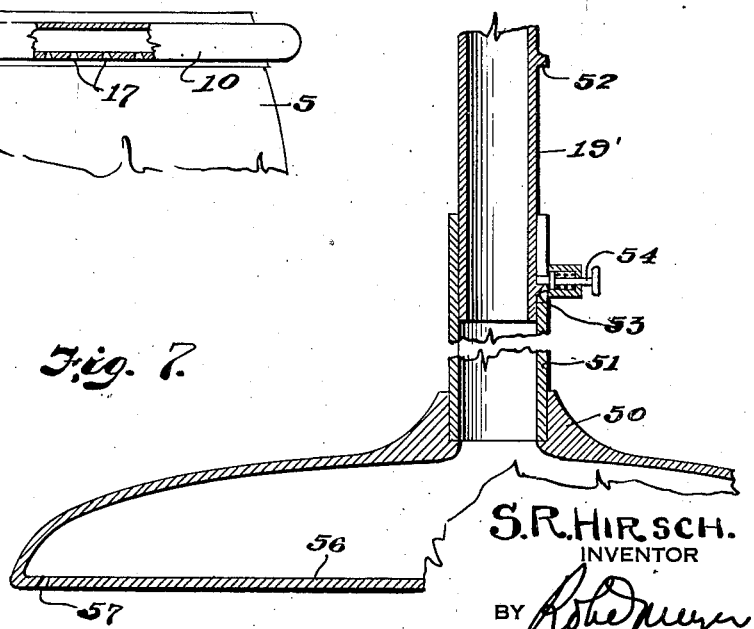
S. R. HIRSCH
INVENTOR Dec. 20, 1938.  S. R. HIRSCH  2,140,744
BEER COOLING AND DISPENSING APPARATUS
Filed Feb. 4, 1937  4 Sheets-Sheet 4
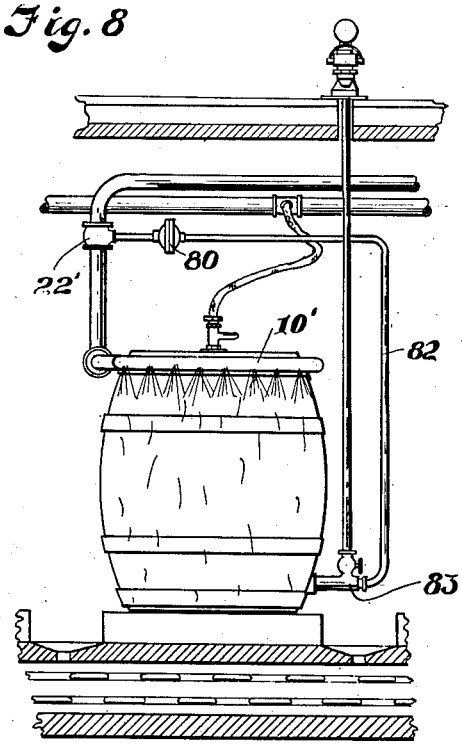
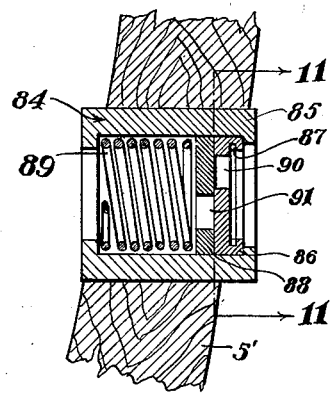
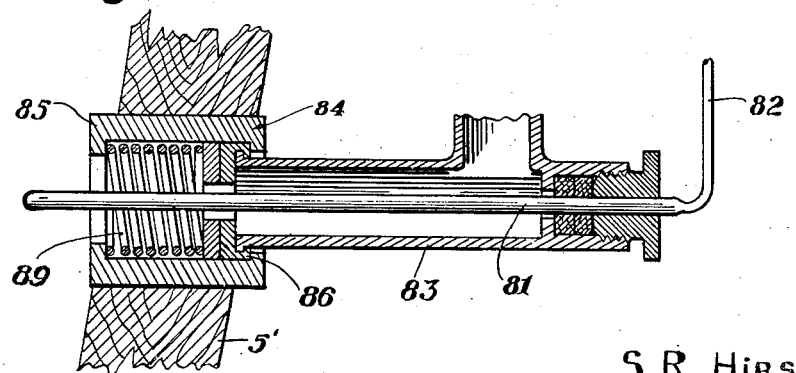
S. R. HIRSCH
INVENTOR
BY
ATTORNEY Patented Dec. 20, 1938

2,140,744

UNITED STATES PATENT OFFICE 2,140,744

BEER COOLING AND DISPENSING APPARATUS

Sylvan R. Hirsch, Utica, N. Y., assignor to Carbondale Machine Corporation, Harrison, N. J., a corporation of New Jersey Application February 4, 1937, Serial No. 124,092

20 Claims. (Cl. 62—7)

This invention relates to the dispensing of beer and similar brew, and more particularly to a method and apparatus for use in barrooms, taverns, restaurants and like places, for dispensing beer, ale, or other similar brews for consumption.

Many conditions have resulted in efforts to simplify and reduce the cost of the cooling and dispensing of beverages such as beer, ale, and similar brews, and to deliver the brew to the consumer in a pure and unspoiled condition, and without impairing its flavor.

Deterioration of beer or the like between the time it leaves the brewery and the time it reaches the consumer is due to a number of causes, such as unsanitary feed pipes and cooling coils in which slimy deposits of certain ingredients of the beer accumulate, developing germ cultures and spoiling or altering the taste or flavor of the beer, and often affecting the contents of the barrel or keg from which the beer is drawn by the return to the barrel of stale contaminated beer from the coils. This causes what is commonly known as "coil taste" in draught beer.

The present invention comprises a simple, practical and efficient beer dispensing apparatus which is free from any coils through which the beer must pass from the barrel to the dispensing valve, and reduces to a minimum the metal surfaces contacted by the beer, permitting the beer to be dispensed with true "keg flavor", or without impairment of its flavor due to unsanitary coils, pipes, or the like.

Other beer dispensing apparatus has been provided which approaches the apparatus of the present invention in the manner of dispensing of the brew direct from the keg, but these devices provide cooling coils which are located inside of the barrels that contain the beer, for the purpose of cooling the beer. There are many disadvantages to this type of dispensing apparatus, such as the fact that the cooling coils in the barrels interfere with the "pitching" of the barrels by the brewer, much of the pitch accumulating on the coils and interfering with their subsequent cooling action. Then also the brewer must exercise care to keep the barrels which are equipped with the internal cooling coils separate from barrels which are not so equipped, separate storage for the coil equipped barrels must be provided, care must be taken in the delivery of beer in the barrels to the retailer, and also the brewer is put to the further additional expense of installing and maintaining the cooling coils in the barrels for which he can make no additional charge because of competitive conditions in the sale of beer, ale, or the like.

Also, there have been attempts in beer dispensing and cooling apparatus to cool the beer in the kegs by circulation around the barrels in a cabinet of a cooling gas, such as $CO_2$, chilled air, or the like. However, in such installations, it is impossible to accurately control the cooling of the beer, to maintain different degrees of cooling of different barrels at the same time, and also it is impossible to cool the beer to the desired temperature in a reasonable length of time.

An object of the present invention is to provide a beer-cooling and dispensing apparatus which may be attractively designed to take the place of the usual bar, or a part of the bar, in a barroom, tavern, restaurant or the like, if it is so desired, which apparatus embodies cooling means so designed and constructed that it will operate effectively and efficiently in connection with any barrel or keg such as is used in the transportation and dispensing of beer, ale, or the like, without requiring any alterations in the barrel, additions thereto, or coils inserted therein, and further to provide such a cooling apparatus which will not only cool the beer in the barrels or kegs to the desired temperature for consumption in a reasonable length of time, but will enable individual cooling of a plurality of barrels in a single cabinet so that accurate control of the temperature of the brew to be dispensed from each individual barrel or keg may be maintained.

Another object of the present invention is the provision of a dispensing apparatus as specified which embodies automatic control means whereby the temperature of the beer in the barrel may be accurately controlled within a predetermined temperature range, and whereby, when there are a plurality of barrels in a single apparatus, the temperature of the contents of the different barrels may be independently controlled, thereby permitting the dispensing of brew from different barrels in the same apparatus at different temperatures if desired, permitting the relatively quick bringing of the temperature of a new barrel placed in the cabinet while others are retained therein to proper consumption temperature without affecting the temperature of the brew in the retained barrels, and/or preventing excessive chilling of the others' contents when chilling the contents of one barrel to the desired degree.

A further object of the present invention is to provide a cooling and dispensing apparatus of the type above referred to which will permit easy and convenient removal of a barrel when empty and installation of a full barrel or keg in the apparatus, and will permit variation of the make or kind of beer, ale or the like, dispensed, since the apparatus will receive and effectively operate with any barrel or keg of the type commonly employed in the transportation and dispensing of such brew.

With these and other objects in view, as may appear from the accompanying specification, the invention consists of various features of construction and combination of parts, which will be first described in connection with the accompanying drawings, showing a beer cooling and dispensing apparatus embodying the invention, and the features forming the invention will be specifically pointed out in the claims.

In the drawings:

Figure 3 is a fragmentary horizontal section taken on the line 3—3 of Figure 1.

Figure 4 is a fragmentary horizontal section taken on the line 4—4 of Figure 3.

Figure 6 is a fragmentary side elevation of a modified form of the showering apparatus.

Figure 7 is a detail section taken on the line 7—7 of Figure 6.

Figure 8 is a fragmentary view of a modified form of the brew dispensing apparatus.

Figure 9 is an enlarged detail section through the brew dispensing apparatus illustrating the thermal control for controlling the cooling of the brew.

Figure 10 is an enlarged detail section similar to Figure 9 but showing only the valve structure carried by the container and showing the said valve structure in closed position to prevent the dispensing of brew from the container.

Figure 11 is a detail section taken on the line 11—11 of Figure 10.

Figure 1:
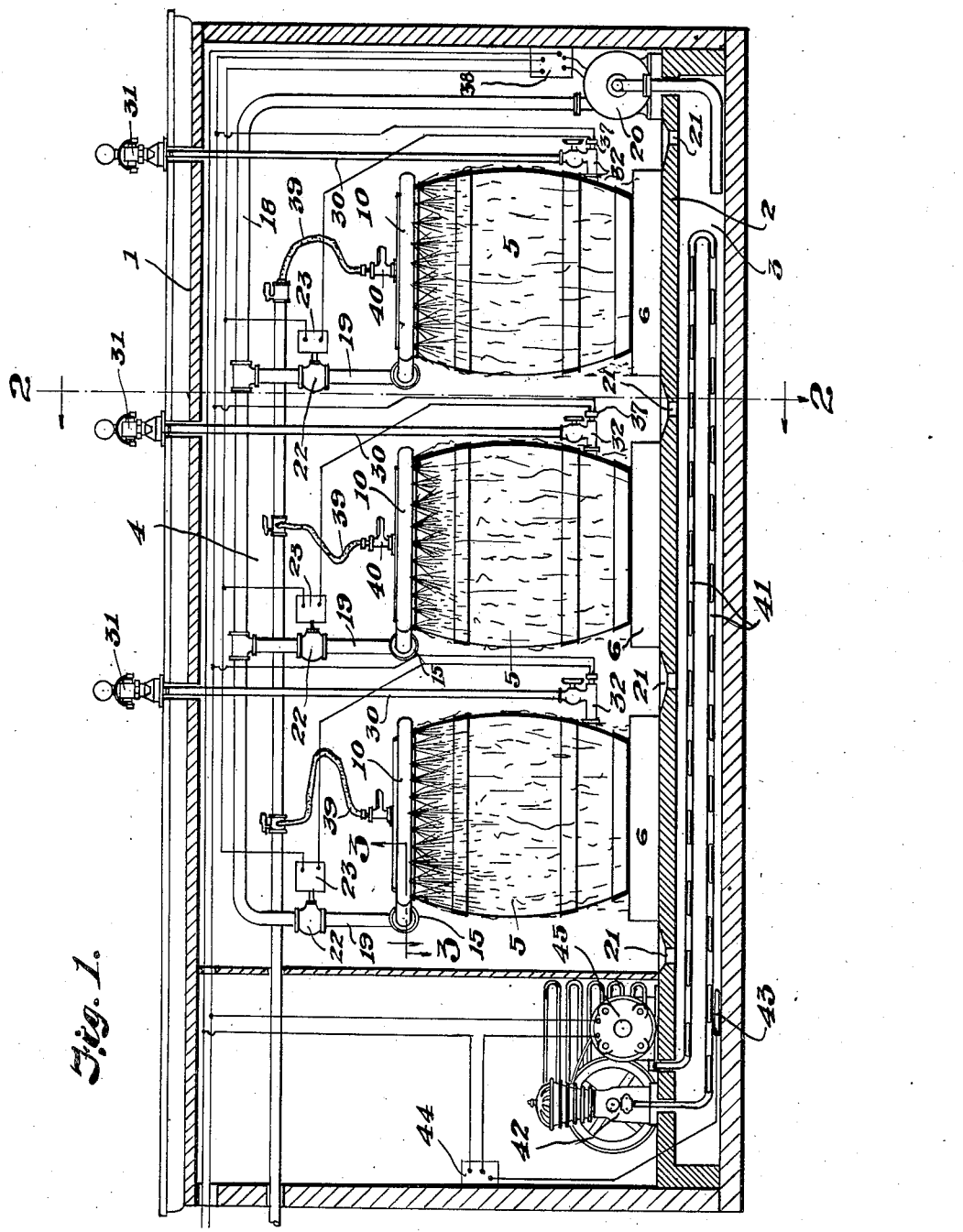
Figure 1 is a longitudinal vertical section through the beer cooling and dispensing apparatus comprising the present invention.

Referring more particularly to the drawings, the improved brew cooling and dispensing apparatus comprises a cabinet 1 which has a horizontal partition therein forming a cooling liquid retaining tank 3 below the brew container compartment 4 of the cabinet. If it is so desired, the barrels, kegs, or other containers 5, which are preferably containers in which the brew to be dispensed is transported, may rest directly upon the partition 2 or individual supports as indicated at 6 may be provided for the containers. The cabinet 1 has doors 7 therein by means of which the barrels, kegs or other containers 5 may be placed in the cabinet, or removed therefrom when they are emptied.

The mechanism or apparatus for cooling the brew within the barrels or containers 5 includes shower rings 10 which are of sufficient size to fit about the tops or upper ends of the barrels or containers 5 when the latter are placed in dispensing positions. The shower rings 10 are pivotally or swingably supported in any suitable manner within the cabinet 1 so that they may be moved off the barrels and out of the way when an empty barrel is to be removed and will be in position for free and easy movement over a new barrel placed in the cabinet.

In the drawings, a particular construction is illustrated for pivotally or swingably supporting the shower rings 10, but it is to be understood that this particular construction is merely one manner in which the shower rings may be supported, and that any desired construction for supporting the rings to permit them to be moved into or out of operative relation with a barrel or container 5 may be provided without departing from the spirit of the present invention. Another form or construction for supporting the shower rings is shown in Figures 6 and 7 of the drawings.

Reverting to the particular manner of supporting the shower rings shown in Figures 1 to 4 inclusive of the drawings, the rings have a supply connection 11 formed thereon which branches to provide the spaced arms 12. The arms 12 are connected in any suitable manner to open-ended trunnion nipples 14. The nipples 14 extend inwardly into a coupling 15, having their inner ends spaced as clearly shown in Figure 3, so that the liquid refrigerant entering the chamber 16 in the coupling 15 may pass into and through the nipples 14, the connection 11, and into and out of the rings 10 through the shower openings 17 therein. The coupling 15 is connected to and supported from the cooling liquid supply pipe 18 by the respective branch pipes 19.

Cooling liquid, preferably a solution of water and some other liquid having a very low freezing point, such as Prestone, or the like, is delivered to the shower rings 10 from the tank 3 by a pump 20, which is preferably operated by an electric motor (not shown) and has its suction opening into the tank 3 so that the cooling liquid will be pumped through the supply pipe 18, branch pipes 19 and into the shower rings 10, from which it will shower over and about the kegs 5, contacting therewith and running downwardly over the kegs to the bottom of the compartment 4 from which it will drain through the suitable drain openings 21 back into the tank 3.

Each of the branch pipes 19 has a solenoid operated valve 22 therein which controls the delivery of the cooling liquid to the respective shower rings, and thus by operation of these valves 22 the showering of the cooling liquid over the barrels or containers 5 is controlled so that the cooling liquid may be showered over all of the kegs or barrels or over any one of them as desired or as necessary to bring or maintain the contents of the barrel or container to the desired temperature for consumption. This is an advantage, because all of the barrels or containers will not be emptied at the same time, and it will be necessary to shower the cooling liquid over a new keg to bring its contents to the desired temperature over a longer period of time than will be required to maintain them at their proper temperature.

An automatic control of the showering of the cooling liquid over the barrels or containers is provided, and this automatic control is operated from the temperature of the brew in the individual barrels or containers.

Figure 2:
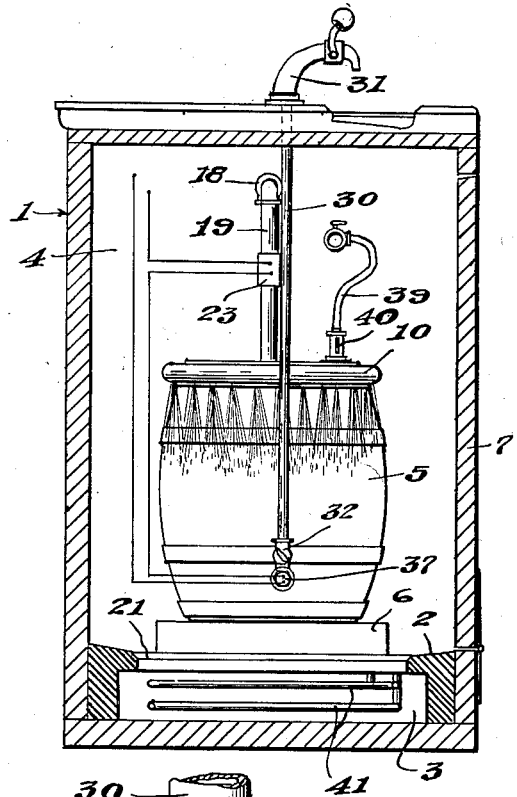
Figure 2 is a vertical section through the apparatus taken on the line 2—2 of Figure 1.
Figure 5:
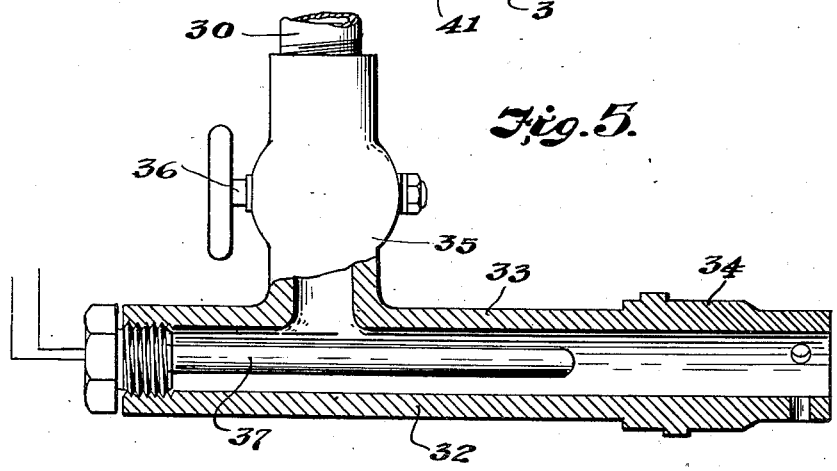
Figure 5 is an enlarged detail partly in section of a tapping bung employed in the apparatus.

With the present system of cooling, the beer or other brew is kept at a proper dispensing temperature within the barrels or containers 5, and it can therefore be dispensed directly from the containers without having to pass through any chilling medium such as coils or the like, and with the cabinet of the type as shown in the drawings which may be used either directly under or in place of the bar, a short combined draught tube with attached faucet may be used. In Figures 1 and 2 of the drawings this draught apparatus is shown as comprising the straight draught tubes 30 which have the approved type of outlet faucet 31 attached to their upper ends which project out of the top of the cabinet 1. The tubes 30 extend downwardly into the cabinet entirely outside of the kegs or containers 5 and they have tapping bungs 32 connected to their lower ends. These tapping bungs 32 are of the general type known as lager faucets or tapping bungs to the trade, and they comprise straight cylindrical tubes 33 which have couplings 34 on one of their ends to facilitate their attachment to the barrel or container 5. The cylindrical bodies 33 have angularly extending branches 35 thereon in which are mounted hand operated valves 36 of any approved construction whereby the flow of brew from the barrels or containers 5 may be manually controlled at the tapping bungs 32. The tapping bungs 32 are connected to the barrels or containers 5 near the bottoms thereof, as is the approved established practice. The brew flows through the cylindrical bodies 33 through the branches 35 thereon and upwardly through the draught tubes or pipes 30. The draught tubes or pipes 30 are preferably detachably connected to the tapping bungs 32 and to the faucets 31 so that they may be easily disconnected for cleaning.

The draught tapping bungs 32 have temperature controls or thermal relays 37 removably positioned therein. These thermal relays are of well-known type and can be purchased upon the open market, one type being manufactured by Thomas A. Edison, Inc., therefore their particular construction will not be considered herein. These thermal relays or temperature control switch structures 37 are connected in circuit with the solenoids 23 of the solenoid operated valves 22 as clearly shown in Figure 1 of the drawings, so that when the temperature of the brew in the barrel or container 5 and consequently in the tapping bung 32 reaches a predetermined temperature, the valve 22 will be operated to cut off the flow of the cooling liquid to the respective shower ring. Thus the showering of the cooling liquid over each barrel or container 5 directly and automatically controlled by the temperature of the brew within the barrel.

Owing to the fact that the pump 20 requires power for its operation, and since power is an item of cost, the motor (not shown) which operates the pump 20 is connected in circuit by means of a switch structure 38 of any approved construction, many types of which can be purchased upon the open market with the solenoids 23 of all of the solenoid operated valve structures 22. The switch 38 is so constructed that so long as any one of the valves 22 is open for supplying cooling liquid to any one of the shower rings, the motor will be energized, but when all of the solenoid operated valves 22 within the cabinet 1 are closed to cut off the delivery of cooling liquid to the shower rings, the switch structure 38 will operate to deenergize the pump operating motor and shut down the pump 20.

The usual pressure connections for supplying pressure to the inside of the barrels or containers are shown at 39. The pressure gas is delivered into the barrel through the pressure couplings 40 at the top of the barrel and the brew is drawn off from near the bottom of the barrel.

The cooling liquid which is showered over the barrels or containers 5 is cooled within the tank 3 by means of refrigerant coils 41 which are placed in the tank and through which a suitable refrigerant is circulated by means of the refrigerating machine 42 of any approved type. The temperature of the cooling liquid in the tank 3 is controlled by control of the operation of the refrigerating machine 42 through the medium of a thermal relay 43 of any approved type which is placed in the tank 3 and is connected to the stop and start switch 44 that controls the energizing of the motor 45 of the refrigerating machine 42 so that when the temperature of the cooling liquid in the tank reaches the desired predetermined degree the thermal relays 43 will operate the switch 44 to stop operation of the refrigerating machine 42, and when the temperature of the cooling liquid rises above the desired thermal degree, the switch 44 will be operated to start operation of the refrigerating machine 42.

It is desirable to bring the temperature of the brew within the barrels or containers 5 to the desired temperature for consumption as quickly as possible after the barrels have been placed in the cabinet, and also it is desirable to maintain the brew at the desired temperature at all times and to bring it quickly back in case it becomes slightly warm when the operating of the cooling liquid over the barrels is cut off. To provide this relatively quick cooling of the beer it is desirable to chill the cooling liquid to a degree considerably below the temperature at which the brew is to be cooled and even below the freezing point of the brew. It is possible and practical to do this in the present cooling and dispensing apparatus because through the sensitive control of the delivery of the cooling fluid to the spray rings or heads by the thermal relays 37 in the faucets 32, the flow of the cooling liquid may be cut off before the brew reaches freezing point or whenever it reaches the temperature at which it is desired to dispense it, and also with the accurate and delicate control of operation of the refrigerating machine 42 it is possible to maintain the temperature of the cooling liquid substantially constant or within a narrow temperature range at all times.

Also it will be noted from the foregoing and the accompanying drawings that the barrels or containers are entirely free from metal within the barrels, from any type of internal or external coils through which the brew passes and that the brew may be dispensed directly from the barrels or containers through the relatively short straight draught tubes 30, thereby permitting maximum sanitation and cleanliness in the dispensing of the brew with minimum contact of the brew with metal of any kind during its dispensing. Therefore the brew may be dispensed to the consumer without impairment of its flavor. Also, there are no coils, intricate pipe arrangements or the like wherein accumulation may take place and all of the draught structure which includes only the draught tubes and the faucets 31 and tapping bungs 32 may be quickly easily and thoroughly cleaned.

In Figures 6 and 7 of the drawings, a modified construction of the showering or spraying apparatus per se is shown, which comprises a shower head or member 50 which is suitably attached to a length of pipe 51. The length of pipe 51 telescopically receives the branch pipe 19' for spraying the cooling liquid to the shower head or member from the supply pipe 18'. Stops 52 and 53 are carried by the pipe 19' and any suitable type of stop mechanism, such as a spring pressed plunger structure 54, is carried by the pipe 51 for holding the shower head 50 in its lower showering position or holding it upwardly out of showering position to permit the removal of an empty barrel or container 5' from the cabinet and the placing of a full barrel or container 5' therein. The shower head or member 50 may be of any approved construction, and in the drawings, it is shown as a hollow, flaring head having a plurality of openings 57 in the bottom 56 thereof near the circumference of the bottom for showering the cooling liquid downwardly over the outside of the barrel or container 5'.

The modified form shown in Figures 6 and 7 shows only one other construction which the shower member may have, and it is to be understood that any suitable type of shower member and means of supporting it to permit movement into or out of showering position relative to a keg or container may be provided without departing from the spirit of the present invention.

In Figures 1 to 5 inclusive the thermal control mechanism carried by the draught or tapping bung 32 together with the operating mechanism 23 of the valve 22 is shown as electrically operated apparatus. However, it is to be understood that any suitable type of mechanism for operating the valves 22 under predetermined temperature variances of the brew in the container may be provided without departing from the spirit of the present invention.

In Figures 8 and 9 of the drawings a different type of mechanism for controlling operation and for operating the valves which control the spraying of the cooling fluid or liquid is shown which is a pressure operated temperature controlled system.

Referring particularly to these Figures 8 and 9 the flow of the cooling liquid to the spray ring 10' is controlled by a valve 22' of any approved construction. The valve 22' is however opened and closed by a pressure actuated mechanism 80 which may be of any approved structure such as can be purchased upon the open market. The pressure actuated valve opening and closing mechanism 80 is operated by pressure variances of a volatile liquid which is contained in an element 81 and is connected by any suitable connecting means as pipe, hose, or the like, as shown at 82 to the mechanism 80.

The element or tube 81 is removably carried by the draught or tapping bung 83 and it extends through the tapping bung 83 and through the valve structure 84 into the interior of the transportation container 5' for the brew. Therefore the volatile liquid or gas within the element or tube 81 is subjected directly to the temperature of the brew within the container 5'. The volatile liquid or gas in the tube 81 is of the type that shrinks as its temperature is lowered and expands upon increase of its temperature; thus, when the temperature of the brew in the container 5' is at the proper temperature for dispensing, the volatile liquid or gas in the tube 81 will have shrunk sufficiently to permit the pressure actuated mechanism 80 to close the valve 22' and cut off the flow of the cooling liquid through the spraying device 10'. When the temperature of the brew rises the volatile liquid or gas will expand and operate the pressure operated mechanism 80 for opening the valve 22' to permit the spraying flow of the cooling liquid to and from the spraying apparatus 10'. As shown in Figure 8 of the drawings and as also will be observed with respect to Figures 1 to 5 of the drawings, the thermal control element or device is carried by the tapping bung which is in turn connected to the draught tube through which the brew is dispensed and also in both forms, either the element 37 or the tube 81 is removably carried by the tapping bung so that it may be removed from the tapping bung if desired for cleaning.

With the present type of outlet valve for brew containers, a check valve is employed which is closed by the pressure of the brew there against and is opened by the tapping bung to permit the outward flow of the brew; however, it may be found desirable to insert the thermal element (which may be either the element 37 or the tube 81) into the brew within the container, and to permit this insertion, one form of outlet valve structure is shown in Figures 9 to 11 inclusive, but it is to be understood that the broad idea of the insertion of a thermal control-element through the valve into the container is not to be limited to the specific type of valve shown, since Figures 9 to 11 show only one type of such valve.

The particular type of valve shown in Figures 9 to 11 and generically indicated by the numeral 84 comprises a valve housing 85 which carries a rotatable valve disc 86 embodying features of construction as indicated at 87 by means of which the tapping bung 83 may be connected thereto. The rotary disc 86 abuts against a non-rotating disc 88 and the discs 86 and 88 are urged into liquid tight engagement with each other and the disc 86 with the housing 85 by means of the pressure of the brew within the container 5' and the action of a spring 89. The spring 89 is mounted within the housing 85 and engages against the inner side of the disc 88. The rotary disc 86 is provided with an outlet opening 90 while the disc 88 has an opening 91 therein. During transportation of the container 5' and prior to the connection of the tapping bung 83 thereto, the disc 86 is rotated so that the opening 90 will be out of registration with the opening 91 and thus the outlet of the brew from the container will be cut off. The element or tube 81 is slidably carried by the tapping bung 83 and when the tapping bung is connected to the valve structure 84 to permit the dispensing of the brew, the disc 86 is rotated to bring the openings 90 and 91 into registration thus permitting the brew to flow into the tapping bung 83. After the openings 90 and 91 are brought into registration the element 81 is moved inwardly therethrough into the interior of the container 5' as shown in Figure 9 of the drawings so as to permit the controlling of the flow of the cooling liquid over the container 5' by the temperature of the brew within the container.

It will be understood that the invention is not to be limited to the specific construction or arrangement of parts shown but that they may be widely modified within the invention defined by the claims.

What is claimed is:

1. The method of cooling brew, which consists in setting up in dispensing position the transportation container of the brew, chilling the brew by showering a chilled cooling liquid solution having a freezing point below the freezing point of the brew, over the outside of the container, maintaining said cooling liquid within a predetermined temperature range, and controlling the showering of the cooling liquid over the container by the temperature of the brew in the container.

2. The method of cooling brew which consists in setting up in dispensing positions a plurality of transportation containers of the brew, chilling the brew by showering a chilled cooling solution having a freezing point lower than the freezing point of the brew over the outside of the containers, controlling the showering of the cooling liquid over each of the containers independently of the others, whereby any one of the containers may be subjected to cooling action independently of the others, and cutting off the flow of cooling liquid when the temperature of the brew in all of the containers reaches a predetermined degree.

3. The method of cooling brew which consists in setting up in dispensing position the transportation container of the brew, chilling the brew by showering a cooling liquid at a temperature lower than the temperature required for freezing the brew over the outside of the container, controlling the flow of the cooling liquid by the temperature of the brew in the container whereby the flow of cooling liquid will be stopped when the brew reaches a predetermined temperature, and started when the brew rises above the predetermined temperature.

4. The method of cooling brew which consists in setting up in dispensing position a transportation container for brew, chilling the brew by showering a chilled cooling liquid over the outside of the container, and controlling the showering of said cooling liquid over the container by the temperature of brew in the container.

5. In a beer dispensing apparatus the combination, of a cabinet adapted to contain a transportation container for brew, a brew dispensing line for connecting to a transportation container for brew, shower means for showering a cooling liquid over a brew transportation container in said cabinet, means for supplying a cooling liquid to said showering means, means for chilling the cooling liquid, means for controlling the chilling of said cooling liquid whereby the cooling liquid will be maintained at a temperature within a predetermined range, and a thermal control device in the brew dispensing line and connected to said cooling liquid supply means for controlling the showering of cooling liquid over said container.

6. In a beer dispensing apparatus, the combination, of a cabinet adapted to contain a transportation container for brew, a brew dispensing line for connecting to a transportation container for brew, means for showering a cooling liquid over a brew transportation container in said cabinet, means for supplying cooling liquid to said shower means, and a thermal control device in the brew dispensing line and connected to said cooling liquid supply means for controlling the showering of the cooling liquid over said container.

7. In a beer dispensing apparatus, the combination, of a cabinet adapted to contain a transportation container for brew, a brew dispensing line for connecting to a transportation container for brew, means for showering a cooling liquid over a brew transportation container in said cabinet, means for supplying a cooling liquid to said shower means, a valve controlling delivery of cooling liquid to the shower means, and a thermal control device, means for maintaining said thermal control device in heat exchange relation with the contents of said container, and means for connecting said thermal control device to said valve for controlling operation of the valve.

8. In a beer dispensing apparatus, the combination, of a cabinet adapted to contain a transportation container for brew, a brew dispensing line for connecting to a transportation container for brew, of shower means for showering a cooling liquid over a brew transportation container in said cabinet, means for supplying cooling liquid to said shower means, a valve controlling the delivery of cooling liquid to the shower means, and a thermal control device in heat transfer relation with the brew and acted upon by the temperature of brew, said thermal control device connected to said valve for controlling operation of the valve, means for chilling the cooling liquid, and means controlling the chilling of said cooling liquid whereby the cooling liquid will be maintained at a temperature within a predetermined range.

9. In a brew dispensing apparatus, the combination with a plurality of transportation containers for brew, of a shower member for showering cooling liquid over and in contact with each of said containers, a source of cooling liquid common to all of said containers each of said containers having a brew dispensing line connected thereto, means for delivering cooling liquid to the shower members, means for each container for controlling the showering of cooling liquid over it, and a thermal control device in the dispensing line of each container and connected to its companion controlling means for controlling the showering of cooling liquid over the container with which it is associated.

10. In a brew dispensing apparatus, the combination with a plurality of transportation containers for brew, of a shower member for showering cooling liquid over and in contact with each of said containers, a source of cooling liquid common to all of said containers each of said containers having a brew dispensing line connected thereto, means for delivering cooling liquid to the shower member, means for each container for controlling the showering of cooling liquid over it, and a thermal control device in the dispensing line of each container and connected to its companion controlling means for controlling the showering of cooling liquid over the container with which it is associated, and means for stopping said cooling liquid supply means when the temperature of brew in all of the containers reaches a predetermined degree.

11. In a brew dispensing apparatus, a cabinet, a cooling liquid shower ring therein for showering cooling liquid over a container for brew, means for supplying a cooling liquid to said shower ring, means for chilling said cooling liquid, and means for controlling the chilling of said cooling liquid whereby the cooling liquid will be maintained at a temperature within a predetermined range, and means controlled by temperature of brew in the container for controlling the flow of cooling liquid from said shower ring.

12. In a beer dispensing apparatus, the combination, with a transportation container for brew, of a cabinet for containing said container, a shower member mounted in said cabinet, and movable into or out of showering relation with said container, means for supplying a cooling liquid to said shower member for showering over the container to cool its contents, and means controlled by temperature of the brew in said container for controlling the showering of the cooling liquid over the container.

13. In a beer dispensing apparatus, the combination, with a transportation container for brew, of a cabinet for containing said container, a shower member mounted in said cabinet, and movable into or out of showering relation with said container, means for supplying a cooling liquid to said shower member for showering over the container to cool its contents, means controlled by temperature of the brew in said container for controlling the showering of the cooling liquid over the container. means for chilling said cooling liquid, and means controlled by the temperature of the cooling liquid for controlling the operation of said chilling means.

14. In a brew dispensing apparatus, the combination with a cabinet and plurality of transportation containers for brew therein, said cabinet having a cooling liquid sump therein, shower members in said cabinet arranged to shower cooling liquid over and in contact with said containers, means for delivering cooling liquid to said shower members, and means controlled by temperature of brew in each container for independently controlling the showering of the cooling liquid thereover.

15. In a brew dispensing apparatus, the combination with a cabinet and a plurality of transportation containers for brew therein, said cabinet having a cooling liquid sump therein, shower members in said cabinet arranged to shower cooling liquid over and in contact with said containers, means for delivering cooling liquid to said shower members, means controlled by temperature of brew in each container for independently controlling the showering of the cooling liquid thereover, and means for stopping said cooling liquid supply means when the temperature of brew in all of the containers reaches a predetermined degree.

16. In a brew dispensing apparatus, the combination with a cabinet and a transportation container for brew therein, a shower member in the cabinet, said shower member constructed and arranged whereby it may be moved into or out of showering position relative to the container, a cooling liquid tank in said cabinet, means for delivering cooling liquid from said tank to said shower member, and means controlled by the temperature of brew in said container for controlling the delivery of cooling liquid to the shower member.

17. In a brew dispensing apparatus, the combination with a transportation container for brew, of a cabinet for containing said container, a shower member in the cabinet, said shower member constructed and arranged whereby it may be moved into or out of showering position relative to the container, a cooling liquid tank in said cabinet, means for delivering cooling liquid from said tank to said shower member, means controlled by the temperature of brew in said container for controlling the delivery of cooling liquid to the shower member, said cooling liquid returning to said tank after showering over said container, cooling coils in said tank, means for circulating a refrigerant through said coils to chill said cooling liquid, and means controlled by temperature of the cooling liquid for controlling operation of said refrigerant circulating means.

18. In a brew dispensing apparatus, the combination with a transportation container for brew, of a shower member arranged to shower cooling liquid over said container, pressure operated means for controlling the showering of cooling liquid over said container, and means responsive to temperature of brew in the container for operating of said pressure operated means.

19. In a brew dispensing apparatus the combination, of a cabinet adapted to contain a transportation container for brew, a shower member in said cabinet, said shower member constructed and arranged whereby it may be moved into or out of showering position relative to a brew transportation container, a cooling liquid tank in said cabinet, means for delivering cooling liquid from said tank to said shower member, a brew dispensing line for connection with a brew transportation container, and means controlled by the temperature of brew in said dispensing line for controlling the delivery of cooling liquid to the shower member.

20. In a brew dispensing apparatus the combination, of a cabinet adapted to contain a transportation container for brew, a shower member in said cabinet, said shower member constructed and arranged whereby it may be moved into or out of showering position relative to a brew transportation container, a cooling liquid tank in said cabinet, means for delivering cooling liquid from said tank to said shower member, a brew dispensing line for connection with a brew transportation container, and means controlled by the temperature of brew in said dispensing line for controlling the delivery of cooling liquid to the shower member, said cooling liquid returning to said tank after showering over said container, cooling coils in said tank, means for circulating a refrigerant through said coils to chill said cooling liquid, and means controlled by temperature of the cooling liquid for controlling operation of said refrigerant circulating means.

SYLVAN R. HIRSCH.